United States Patent [19]

Luker

[11] Patent Number: 4,828,780
[45] Date of Patent: May 9, 1989

[54] METHOD FOR ENCAPSULATING EXTRUDING MATERIALS

[75] Inventor: Keith W. Luker, Little Falls, N.J.

[73] Assignee: Killon Extruders, Inc., Cedar Grove, N.J.

[21] Appl. No.: 127,067

[22] Filed: Dec. 1, 1987

[51] Int. Cl.$^4$ ............................................. B29C 47/04
[52] U.S. Cl. .................................. 264/171; 264/173; 425/132
[58] Field of Search ...................... 264/75, 4, 167, 171, 264/173, 174; 425/114, 130, 131.1, 132, 182, 185, 190, 192 R, 199, 376 A, 376 B, 381, 462, 465, 466, 467, 382.3, 382.4

[56] References Cited

U.S. PATENT DOCUMENTS

| | | | |
|---|---|---|---|
| 2,815,033 | 12/1957 | Braunlich | 137/7 |
| 2,822,574 | 2/1958 | Lavash | 425/132 |
| 3,180,912 | 4/1965 | Rowe, Jr. | 264/171 |
| 3,223,761 | 12/1965 | Raley | 264/95 |
| 3,299,192 | 1/1967 | Lux | 264/48 |
| 3,427,999 | 2/1969 | Schultz | 425/132 |
| 3,453,688 | 7/1969 | Otstot et al. | 425/131.5 |
| 3,461,197 | 8/1969 | Lemelson | 264/172 |
| 3,479,425 | 11/1969 | Lefeure et al. | 264/171 |
| 3,557,265 | 1/1971 | Chisholm et al. | 264/46.1 |
| 3,724,985 | 4/1973 | Burlis et al. | 425/132 |
| 3,792,945 | 2/1974 | Randall | 425/132 |
| 4,056,344 | 11/1977 | Lemelson | 425/132 |
| 4,128,386 | 12/1978 | Wissinger et al. | 425/462 |
| 4,376,625 | 3/1983 | Eckardt | 425/564 |
| 4,469,475 | 9/1984 | Krysiak | 425/132 |

FOREIGN PATENT DOCUMENTS 1382291 11/1963 France .
1370281 9/1970 United Kingdom .

Primary Examiner—Jeffery Thurlow
Assistant Examiner—Jill L. Heitbrink
Attorney, Agent, or Firm—Morgan & Finnegan

[57] ABSTRACT

The invention provides a method for encapsulating extrudable materials within an extruded stream of another extrudable material. The produced product is an extruded material that contains one or more different materials embedded within the first material. The boundaries between this first encapsulating material and the material or materials thus encapsulated are well-defined and distinct. In the preferred embodiment, the encapsulated and encapsulating materials are plasticized thermoplastic resins. A stream of the encapsulating material is formed in a first extrusion channel. A plasticized stream of the material to be encapsulated, coated by a coextruded layer of the encapsulating material, is simultaneously formed and travels through a second extrusion channel. At any selected time, a cross-sectional segment of the second stream may be removed from its stream and replaces a similar cross-sectional portion of the stream removed from the first channel. The resulting stream of material extruded from the first channel contains discrete and uniformly shaped units of the second material encapsulated within a continuous stream of the first material.

13 Claims, 17 Drawing Sheets

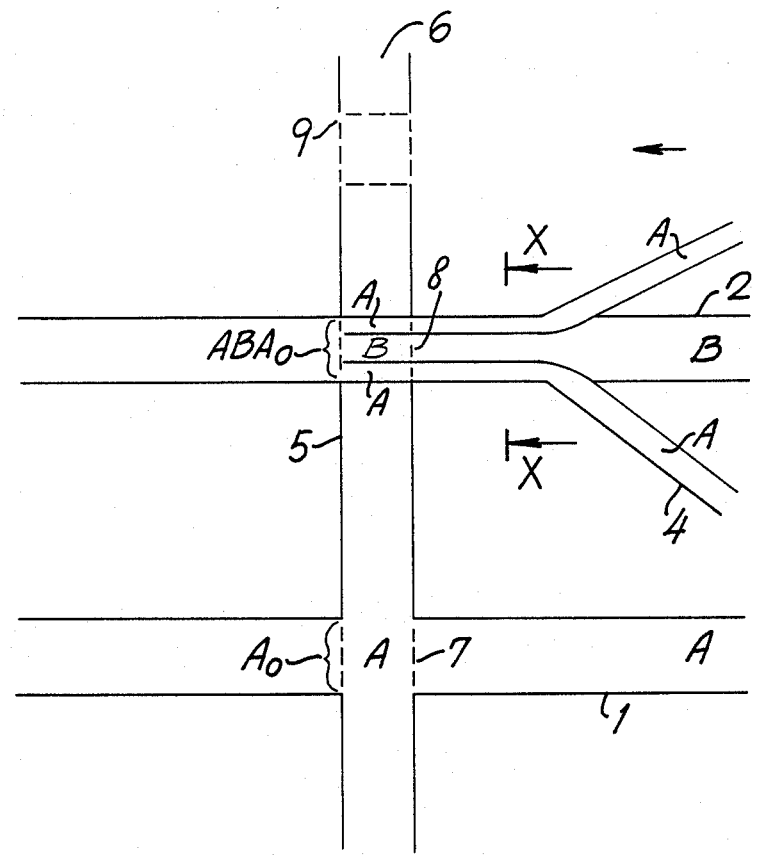
FIG. IA

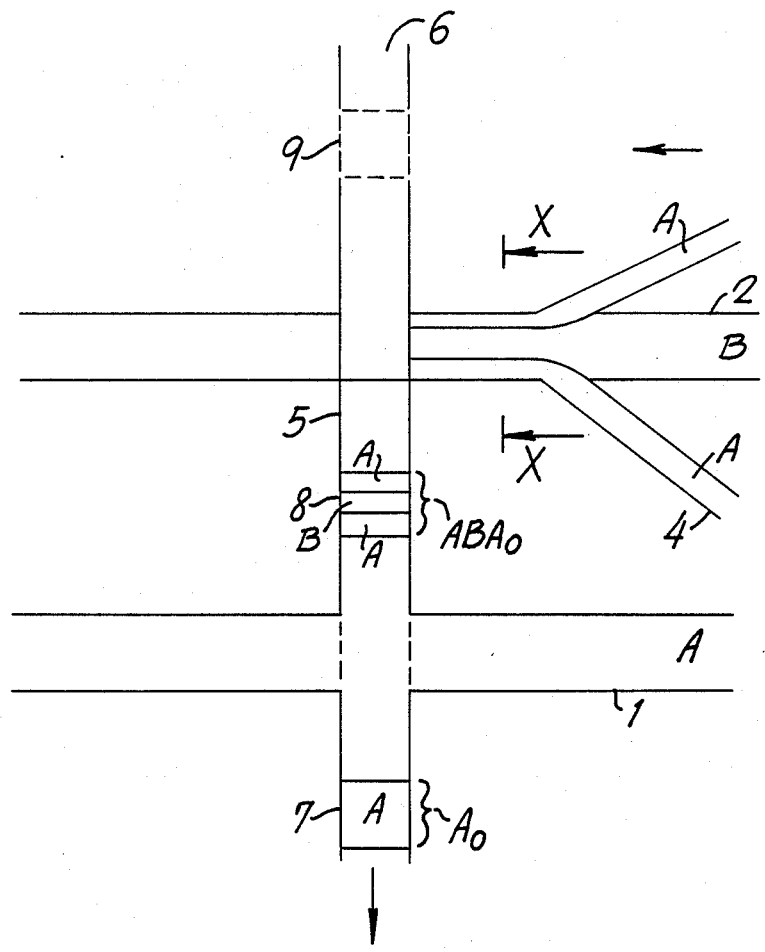
FIG. IB

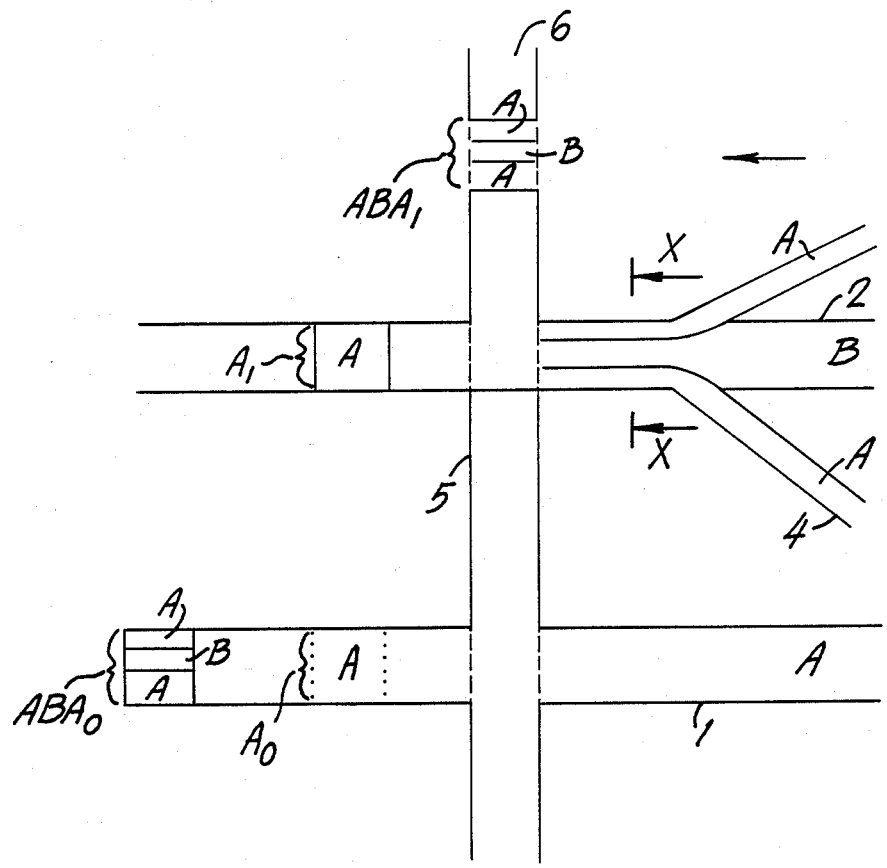
FIG. IE

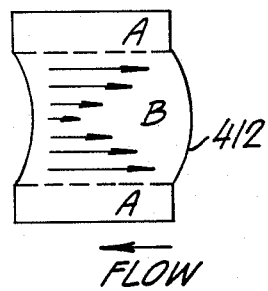
FIG. 9A
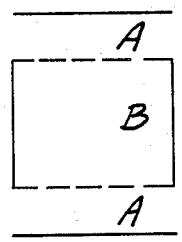
FIG. 9B
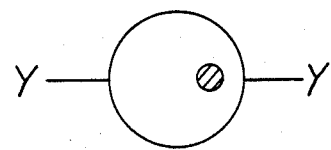 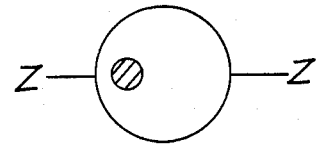
FIG. 12A  FIG. 12B t=0 t=1 t=1

METHOD FOR ENCAPSULATING EXTRUDING MATERIALS

This invention relates to a method and apparatus for encapsulating one or more extrudable materials within a stream of a different extrudable material.

It is desirable to be able to produce, by extrusion techniques, a product in which discrete units of one type of extrudable material are encapsulated within a second type of extrudable material, maintaining borders between the encapsulated and encapsulating materials that are sharp and distinct. Such an encapsulated material should also have a uniform and easily reproducible shape. While methods and devices for preparing a variety of products of different shapes and composition by extrusion methods are known to those skilled in the art, none are known which are capable of satisfactorily producing such an encapsulated product.

U.S. Pat. No. 3,557,265 (Chisholm et al) discloses a method for preparing a sheet of thermoplastic resinous material comprising a plurality of laminates. In the disclosed method, a plurality of closely adjacent flowing streams having generally planar surfaces are introduced into an extrusion apparatus. The height and width of the composite stream are then reduced in one direction and increased in a perpendicular direction. The result is a generally planar sheet comprising diverse thermoplastic laminates. The sheet does not, however, contain discrete segments of either resin, as each of the resin streams are continuously extruded, running parallel to the flow direction in the final product stream that exits from the die orifice of the extrusion apparatus.

U.S. Pat. Nos. 3,299,192 (Lux), 3,724,985 (Burlis et al), 3,223,761 (Raley), and 4,056,344 (Lemelson) disclose methods for preparing plastic piping. These inventions involve the preparation, through extrusion techniques, of tubes or pipes with various coextruded layers. None of these products, however, contain segmented, encapsulated sections.

Other patents describe methods and devices that provide for the coextrusion of multi-colored polymer sheets and fibers. U.S. Pat. Nos. 4,128,386 (Wissinger et al) and 3,792,945 (Randall) disclose devices for sheet extrusion. U.S. Pat. Nos. 2,815,033 (Braunlich), 3,180,912 (Rowe), 3,453,088 (Otstot) and 3,451,197 (Lemelson) disclose inventions related to fiber spinning. Those inventions involve the injection of a thermoplastic resin into the melt stream of another such resin.

However, the prior known devices and methods were generally unable to produce a discrete encapsulated product that has distinct and uniform borders between the first and second thermoplastic materials. Instead, because of their inability to precisely control the commencement and termination of the flow of the secondary material as it is injected into the stream of the primary material, the borders between the two materials are generally not well defined. Some deformation of one material into the other at these boundaries is thus inevitable in the practice of these inventions. Furthermore, this lack of control made it difficult or impossible to precisely control the amount of secondary material that is to be introduced into a primary stream.

Another factor that has contributed to the inability to produce a uniformly shaped encapsulated product was caused by boundary layer drag attributable to the slower flow of material along the walls of an extrusion channel. This drag effect tends to produce a product whose encapsulated material segments, when viewed perpendicular to the extrusion axis, are non-uniform, smeared, elongated and generally deformed along their leading and trailing edges.

As a result, it has not heretofore been possible to readily produce an extruded product where such precise control and definition was sought.

Accordingly, it is an object of the present invention to provide a method and apparatus for encapsulating discrete units of an extrudable material within another extrudable material.

It is another object of the present invention to provide such a method wherein the discrete units so encapsulated have sharp and distinct borders between the encapsulating material.

It is another object of the present invention to provide such a method that may be carried out continuously by an extrusion apparatus.

SUMMARY OF THE INVENTION

These and other objects are accomplished by means of the present invention, which provides a method and apparatus for preparing, by extrusion methods, a product comprised of an extruded stream of material within which are embedded discrete segments of one or more different extrudable materials.

To produce such a product, streams of material are extruded through extrusion channels. Each such stream comprises either a single material or several coextruded materials that form a single stream whose component materials flow parallel to the stream's flow direction. An axial cross-sectional segment of material is removed from one stream and is replaced by an axial cross-sectional segment of material similarly removed from a second stream. The material flowing at the center of the second stream is thereby encapsulated within the material flowing in the first stream. A material thus encapsulated has distinct borders and is not smeared or otherwise disturbed by the encapsulation or subsequent extrusion from the extrusion die.

The term "extrudable material" includes, among other materials, all those that may be extruded from extruders, mixed with whatever modifiers, additives or other materials are desirably included in the final product. These extrudable materials include thermoplastic materials such as melt-extrudable thermoplastic polymers and compositions containing such polymers in admixture with fillers, dyes, pigments, and other additives employed to modify the characteristics of the compositions. These materials may also include, in certain embodiments of the invention, certain oils and waxes.

In a preferred embodiment of the present invention, the extrudable materials are comprised of plasticized thermoplastic resins. A first material is melted within a melt extruder, and is forced to flow into a first melt stream channel. This material will become the encapsulating material. One or more secondary materials are melted in secondary extruders and are forced to flow into secondary melt stream channels which flow parallel to the first stream of material. To prevent the smearing of the different materials in the final product attributable to boundary layer drag created by the walls of the extrusion channels, a layer of the first melt stream's material or of a material indistinguishable from that material is then coextruded through coextrusion melt stream channels onto the surface of the secondary streams. This coextruded surface layer forms a boundary layer that flows between the secondary material streams and the walls of the secondary channels. If the stream with the encapsulated segment experiences boundary layer drag, this drag will not be visible in the final product since the coextruded outer layer bordering the encapsulated segment is indistinguishable from the material of the first melt stream into which it would otherwise be smeared. After encapsulation as described further below, the encapsulated material is located deeply enough within the conveyed segment so that it does not significantly smear.

To encapsulate a segment of one of the secondary materials within the first, cross-sectional segments of both the first and a secondary melt stream are removed from their respective melt streams by variably controllable conveying means. The segment of the second material is introduced into the first melt stream, replacing the cross-sectional segment removed from the first stream. The product thus produced is a melt stream in which discrete units of the secondary melt stream material are encapsulated within a stream of the first melt stream material. This stream of the encapsulated and the encapsulating materials (the product stream) continues to flow through the first melt stream channel and is discharged through the die's orifice and subsequently cooled below the thermoplastic temperature of each material.

In one embodiment of the invention, the variably controllable conveying means comprises a mechanical shuttle that operates in a shuttling channel that connects the melt stream channels. Where there are only two materials, one to be encapsulated and one to encapsulate, the shuttle in this embodiment will consist of a rod or a block-like device that has at least two sampling ports, one for the first melt stream, and a second for the second melt stream.

By this process, an extrudable material is encapsulated, as a discrete unit, within the melt stream of another extrudable material.

This process can be carried out continuously so that the stream of encapsulated and encapsulating materials discharged from the first extrusion channel's die orifice will contain completely encapsulated, well-defined units of the second extrudable material at any desired interval. The operation can be carried out automatically so that manual actuation and intervention are not required.

Both the foregoing general summary description and the following detailed description are merely exemplary and explanatory and are not intended to restrict the invention as claimed.

BRIEF DESCRIPTION OF THE DRAWINGS

The accompanying drawings which are incorporated in and constitute a part of this specification illustrate several embodiments of the invention. With the description, these drawings explain the principles of the invention. In the drawings;

FIGS. 1A–1E are schematic representation, of a preferred embodiment of the method of the invention.

FIGS. 9A and 9B are cross-sections of the shaped shuttle sampling port of FIG. 8 as seen from the top of that shuttle, and of a material segment produced as a result of the operation of the invention with a shaped segment.

FIGS. 12A and 12B are cross-sections along lines Y—Y and Z—Z, the axes of channels 302 and 303, respectively, of FIG. 11.

DETAILED DESCRIPTION OF DRAWINGS

Reference will now be made in detail to present preferred embodiments of the invention, examples of which are illustrated in the accompanying drawings.

Figure 1C:
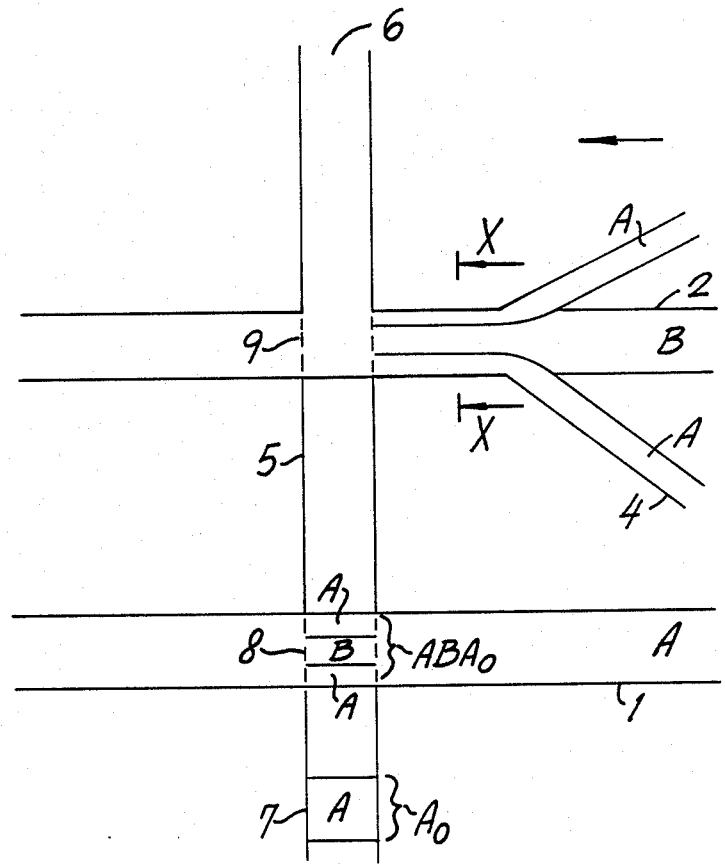

FIGS. 1A–1E depict a preferred embodiment of the present invention. In FIG. 1A, numerals 1 and 2 designate first and second melt stream channels located in a melt extrusion die. A first thermoplastic material represented by the letter A is melted in an extruder (not shown) located upstream of melt channel 1 and then extruded, in plasticized form, through melt stream channel 1 and additionally through annular coextrusion channel 4. A second thermoplastic material represented by the letter B is melted in a second extruder (not shown) upstream of melt channel 2 and extruded, also in plasticized form, through melt channel 2. The thermoplastic materials represented by the letters A and B may be any of those known to those skilled in the art.

Melt stream B flows through the full diameter of channel 2 until it reaches coextrusion channel 4. Coextrusion channel 4 annularly surrounds channel 2. Thermoplastic material A is coextruded onto the entire surface of material B through channel 4, forming coextruded stream ABA. FIG. 2 is a view along line X—X of FIG. 1, along the axis of melt stream ABA in channel 2 after material B has been coextruded onto the surface of melt stream B.

Both coextrusion stream ABA and stream A continue to flow through channels 2 and 1, respectively, until they reach shuttle channel 5, which contains a variably controllable conveying means to remove cross-sectional pieces of material from each of channels 1 and 2. Shuttle channel 5 connects channels 1 and 2. As embodied herein, the variably controllable conveying means in channel 5 is shuttle 6 which contains sampling ports 7, 8, and 9, but may be located either, within or outside the die. Port 7 is initially aligned with melt channel 1 and port 8 is initially aligned with melt channel 2, FIG. 1A. Port 9 is not initially aligned with any melt stream channel. In this embodiment, ports 7, 8 and 9 have equal dimensions.

At the selected moment, shuttle 6 is actuated by a control means connected to the conveying means for controlling the activation of the conveying means. As embodied herein, such means could be a hydraulic or pneumatic reciprocating mechanism. FIG. 1B shows that shuttle 6 has moved downwards in channel 5. Shuttle sampling port 8 contains melt stream segment $ABA_o$ of the coextrusion melt stream ABA, and port 7 contains segment $A_o$ from melt stream A.

The shuttle continues to move downwards until port 8 is aligned with melt channel 1, and port 9 is aligned with melt channel 2, FIG. 1C, where the shuttle pauses. Melt stream A, continuing to flow though channel 1, forces segment $ABA_o$ out of sampling port 8. Segment $ABA_o$ thus becomes part of melt stream A flowing through channel 1, FIG. 1D. A uniformly shaped segment of material B is now encapsulated within material A. Segment $A_o$, still within sampling port 7, is maintained at a temperature sufficient to allow it to remain plasticized either within or outside the die. Sampling port 9, initially empty, allows melt stream ABA to flow though it, continuing through channel 2.

Figure 1D:
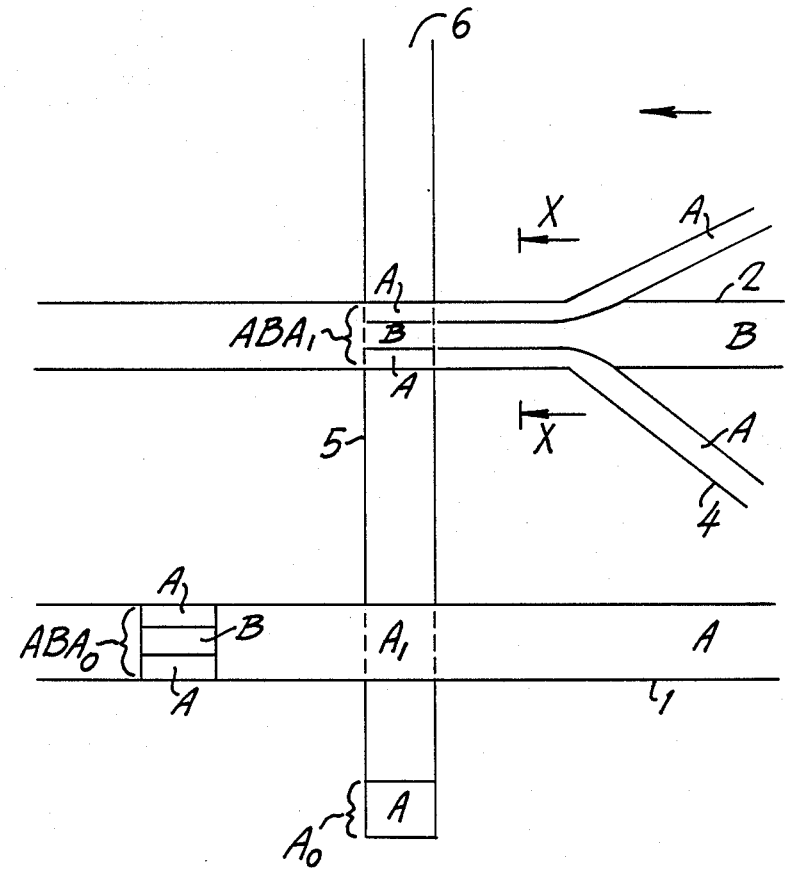
Figure 2:
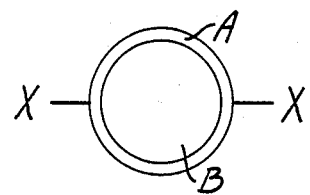
FIG. 2 is a cross-section along line X—X, the axis of channel 2 in FIG. 1A.

FIG. 1D depicts the shuttle and the melt streams at the end of the shuttle's pause. Segment $ABA_o$ is conveyed by melt stream A towards the die orifice of channel 1 (not shown). Sampling port 8 now contains new segment $A_1$ of melt stream A, while sampling port 9 now contains new segment $ABA'$ of coextrusion stream ABA.

Shuttle 6 then returns to its initial position and pauses once again to allow the segments within the sampling ports to be carried out of those ports by the melt streams with which those ports are aligned. After this pause, FIG. 1E, segment $ABA_o$ has been carried further along melt channel 1 towards the die orifice of channel 1. Segment $A_o$ now rejoins melt stream A in channel 1. Segment $A_1$, previously within sampling port 8 and forced from that port by the flow of coextrusion stream ABA in channel 2, now becomes part of the stream in channel 2 and is carried towards the die orifice of channel 2 (not shown).

The shuttle, returned to its initial operating position, may be re-actuated, repeating the sequence of steps depicted by FIGS. 1A-1E.

As a result of this operation, the final product stream extruded from the die orifice of melt stream channel 1 comprises a stream in which material B is surrounded by material A. Thus, the product stream exiting the die from channel 1 is comprised of discrete units of material B totally encapsulated within material A.

Figure 3:
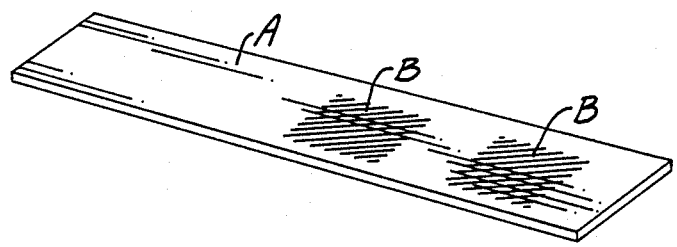
FIG. 3 illustrates a finished product containing discrete units of encapsulated material B enclosed within encapsulating material A.

After material B is thus encapsulated, the shape of the stream within channel 1 may be modified by a shaped die according to techniques well known to those skilled in the art. FIG. 3 depicts a sample of a substantially flat, sheet-like product extruded from melt channel 1 according to an embodiment of the present invention in which discrete and uniformly shaped segments of material B have been encapsulated by material A.

While FIGS. 1A-1E depicts a two-material system in which one type of material has been encapsulated within a second material, it should be apparent to one skilled in the art that any number of additional coextrusion channels may be provided to create a wide variety of multi-component coextrusion streams within channel 2.

To assure that the product produced has leading and trailing borders between the material to be encapsulated (here, B) and the encapsulating material (here, A) that remain sharp, distinct, and as uniformly shaped as was the segment conveyed from the other extruded stream, the layer of encapsulating material, material A, is coextruded onto the surface of stream B in channel 2 before encapsulation takes place. Stream A separates the walls of melt channel 2 from material B flowing through the interior of channel 2 and acts as a boundary layer between the two. After material B is encapsulated, but before it exits through the die orifice, if the walls of channel 1 create drag on the segment ABA conveyed from channel 2, most of the effect of this drag will thus be borne by that part of the segment occupied by material A, which flows along those walls. The portion of segment ABA from channel 2 comprising material A, now flowing in channel 1 will thus tend to be mixed into the portion of material that originated in channel 1 and that immediately follows transferred segment ABA. However, since material A from channel 1 is indistinguishable from material A from channel 2, there is no detectable deformation. Encapsulated material B is located sufficiently deep within channel 2 and is isolated from the walls and the drag created by those walls so that material B will not deform.

Figure 4A:
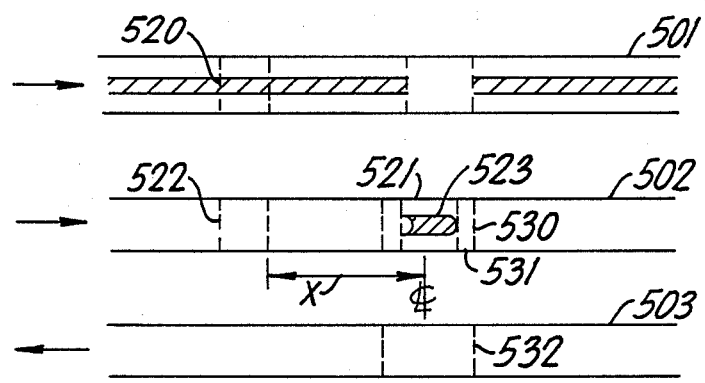
FIGS. 4A–4C are a schematic representation of another embodiment of the method of the invention.
Figure 4B:
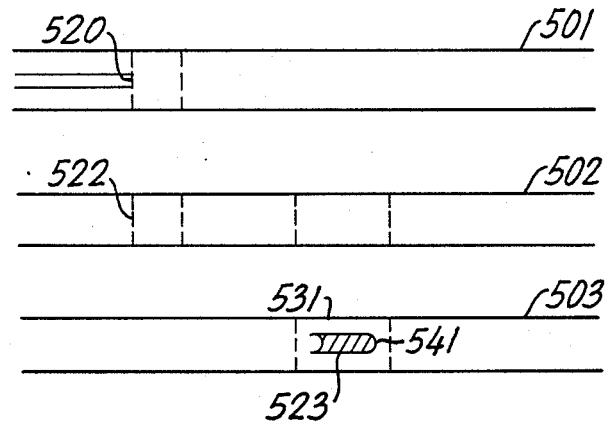
Figure 4C:
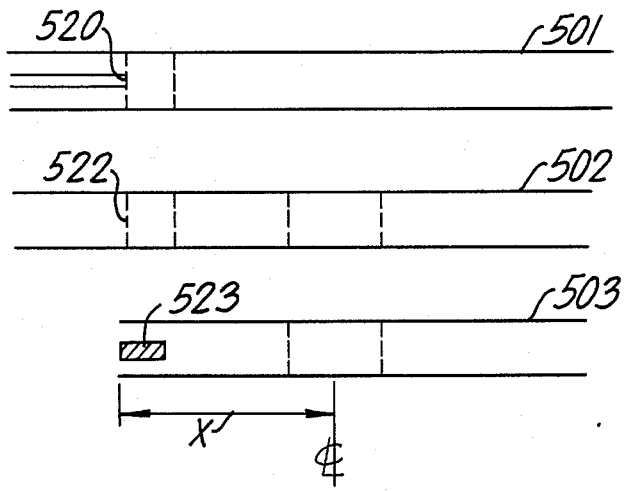

Any deformation that might occur due to boundary layer drag effects on the central part of the product stream carrying an encapsulated material may be largely eliminated by another embodiment of the invention. FIGS. 4A-4C depicts such n embodiment containing extrusion channels 501, 502, and 503. In FIG. 4A, material segment 521, containing encapsulated segment 523, has been conveyed from channel 501 to 502 via sampling ports 520 and 522. Segment 523 has travelled distance "X" through melt channel 502 as measured from the end of material sampling port 522 to the centerline of segment 523. Although the transferred segment originally has uniform, right-angled leading and trailing edges, as the segment travels through channel 502, it may experience some boundary layer drag, deforming its original shape. This deformed shape is shown in exaggerated detail in segment 523, FIG. 4A.

In FIG. 4A, encapsulated segment 523 has entered sampling port 530 in channel 502. The centerline of segment 523 is aligned with the centerline of port 530. Sampling port 530 is slightly longer than ports 520 and 522 so that all of the material, including any deformed trailing edges from segment 523 is contained within port 530. The variably controlled means then conveys material segment 531 into the extrusion stream in channel 503, FIG. 4B.

Channels 502 and 503, and material segment 531 are oriented before segment 531 is inserted into channel 503 so that the portion of segment 531 that once formed its leading edge 541 as it flowed within channel 502, is now the trailing edge as it will flow within channel 503. This may be accomplished, as in the embodiment shown herein, by orienting the flow of the streams in channels 502 and 503 so that they flow in opposite directions, the conveying means operating in the above-described manner between the two parallel streams. If the melt streams are parallel and flow in the same direction, reversal of the segment's relative flow direction may also be accomplished by flipping the sampling port containing segment 531 end-for-end after removing the segment from channel 502. In this manner, the segment 531 will be inserted into channel 503's flow with a reversed flow orientation.

The transferred material segment now travels distance "X" through melt stream channel 503 before exiting from the die orifice at the end of channel 503, FIG. 4C. By the time it exits from the die orifice, the encapsulated segment 523 has experienced the same amount of boundary layer drag in channel 503 as it did in channel 502. Because segment 523 experiences that drag as it flows in the opposite direction, however, any deformation that may have affected it in channel 502 is reversed. Thus, encapsulated segment 523 emerges from the die orifice virtually distortion-free, in the same shape as when it was originally conveyed from channel 501.

Figure 5A:
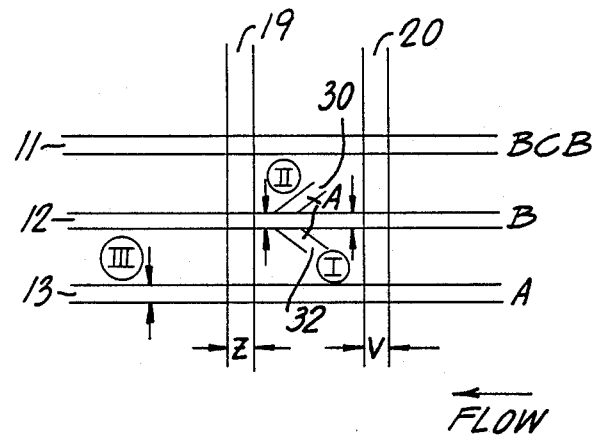
FIGS. 5A–5E are a cross-section of another embodiment of the invention that has three extrusion channels and three shuttle mechanisms, and of a product producible by such an embodiment.

The above illustrations are not intended to limit the possible application of the present invention. Many variations are possible. For instance, the present invention may encapsulate more than one material. FIG. 5A is a cross-section of three parallel extrusion streams with materials BCB, B and A initially conveyed within channels 11, 12, and 13, respectively. Conveying means operating within shuttle channels 19 and 20 may simultaneously and independently carry segments of any of the three extrusion streams to one or more of any of the other streams. In this manner, various sizes, colors, and shapes of encapsulated segments may be produced by a device that follows the method of the present invention.

Figure 5B:
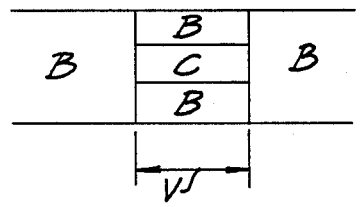
Figure 5C:
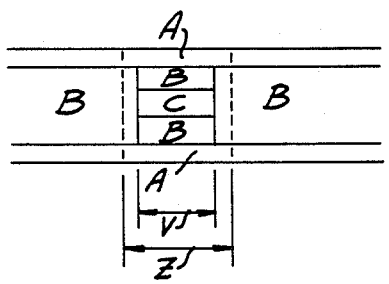
Figure 5D:
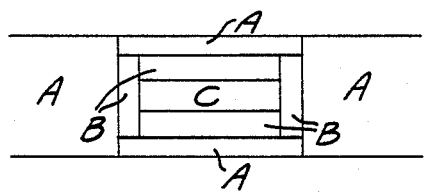
Figure 5E:
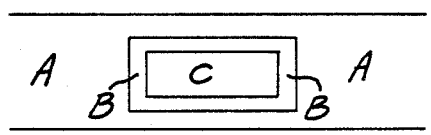

In an embodiment according to this aspect of the invention, FIGS. 5A–5E, material stream BCB in channel 11 is conveyed as described above to material stream B in channel 12 by the operation of conveying means in channel 20. A segment of material C is thus encapsulated. The encapsulated product thus produced flows through channel 12 and past line I—I of FIG. 5A. FIG. 5B shows this segment, of length "v", (the length of the sampling of channel 20), in larger detail. A layer of material A is then coextruded through channels 30 and 32 onto the surface of this stream and reaches location II in FIG. 5A, depicted in larger detail in FIG. 5C. Material stream B in channel 12 carries the segment into the sampling port of the conveying means operating in channel 19. Channel 19's sampling port, of length "Z," FIG. 5A and 5C, is slightly longer than the sampling port of channel 20. The conveying means of channel 19 next conveys the composite segment into channel 13. The segment thus encapsulated is depicted in larger detail in FIG. 5D as it is carried by material stream A past point III of FIG. 5A. Since an observer would not be able to distinguish the borders between encapsulated sections of the same material, the observer would perceive the product of FIG. 5D as shown in FIG. 5E.

Figure 6:
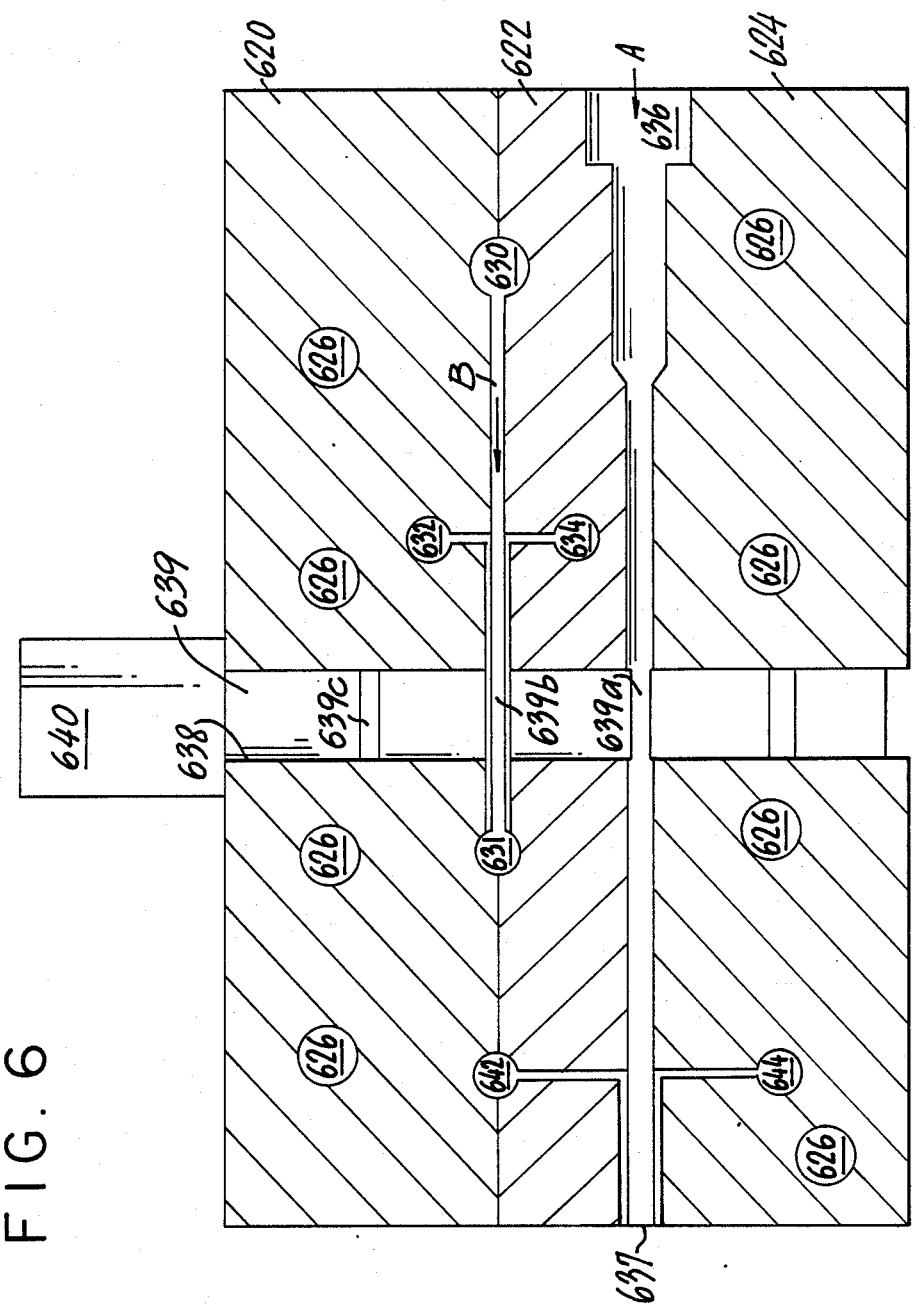
FIG. 6 is a cross-section of an embodiment of an apparatus to carry out the method of the present invention.

FIG. 6 is a cross-section of an embodiment of an apparatus used to carry out the steps of the present invention with thermoplastic materials. The apparatus, an extrusion die, comprises a top plate 620, a middle plate 622, and a bottom plate 624, all of which are connected to each other. Top plate 620 and bottom plate 624 have holes 626 which are to receive heating means designed to maintain the thermoplastic materials above their melt temperature.

As shown in FIG. 6, top plate 620, middle plate 622, and bottom plate 624, when assembled, define certain channels. The channels in this embodiment of the apparatus correspond to certain channels of the embodiment of FIGS. 1A–1E. Channel 630 of FIG. 6 corresponds to channel 2 (containing material B) of FIGS. 1A–1E. Channels 632 and 634 (containing material A) correspond to coextrusion channel 4 of FIGS. 1A–1E. Channel 636 (also containing material A) corresponds to channel 1 of FIGS. 1A–1E. At point 631, channel 30 turns and subsequently discharges its melt stream through a die orifice (not shown).

In this embodiment, the variably controllable conveying means is a shuttle 639 operated by control means 640, which is a pneumatic or hydraulic mechanism capable of reciprocating action. Shuttle 639 and shuttle channel 638 correspond to shuttle 6 and shuttle channel 5 of FIGS. 1A–1E.

Shuttle 639 has channel sampling ports 639(a), 639(b), and 639(c). Port 639(a) functions in the same manner as port 7 of FIGS. 1A–1E and is initially aligned with extrusion channel 636. Port 639(b) functions in the same manner as port 8 of FIGS. 1A–1E and is initially aligned with extrusion channel 630.

In operation, the material to be encapsulated (here, material B) is extruded through channel 630. As material B flows through channel 630, plastified streams of the encapsulating material (here, material A) are introduced via coextrusion channels 632 and 634 and form a coextruded boundary layer that coats material B, flowing between the walls of channel 630 and material B. Coextrusion channels 632 and 634 are sufficiently wide at their discharge point upon melt stream channel 630 to coat all sides of melt stream material B. Coextrusion stream ABA is thus formed.

When encapsulation is desired, control means 640 actuates shuttle 639 within shuttle channel 638. By the method described above and illustrated in FIGS. 1A–1E, the portion of coextrusion stream ABA within sampling port 639(b) is inserted into channel 636, replacing the segment of the melt stream material A removed from channel 636 by sampling port 639(a). The melt stream containing the encapsulated material B flows through channel 636 towards die orifice 637. An optional final coextrusion coating of the encapsulating material A may be applied through coextrusion channels 642 and 644.

A final product such as that illustrated in FIG. 3 is substantially flat, and results when melt stream channel 636 of FIG. 6 discharges its product through a rectangular, flat die orifice. However, the apparatus can be formed so that the extrusion stream channels and their exit orifices have any desired shape. Thus, the final product illustrated in FIG. 3 need not be flat but can have a variety of shapes by shaping the die channels and their exit orifices into configurations well known to those skilled in the art.

Figure 7A:
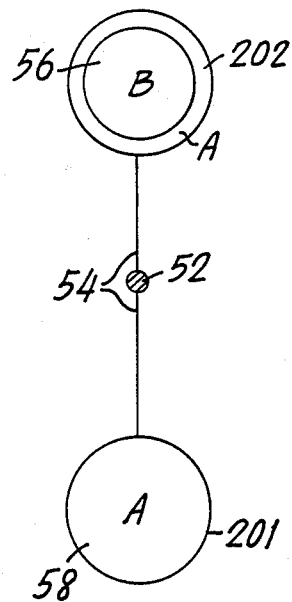
FIGS. 7A–7C are schematic representation of the operation of another embodiment of the present invention using a rotating mechanism for a conveying means.
Figure 7B:
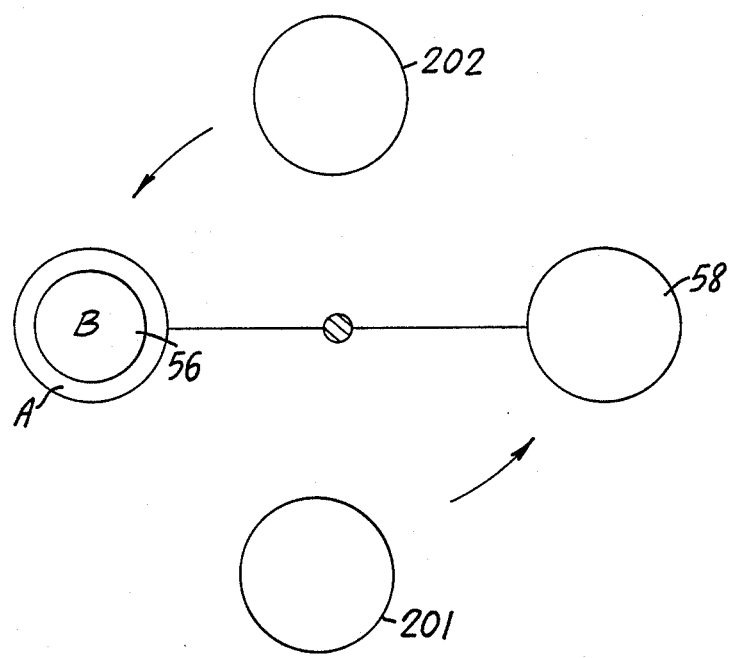
Figure 7C:
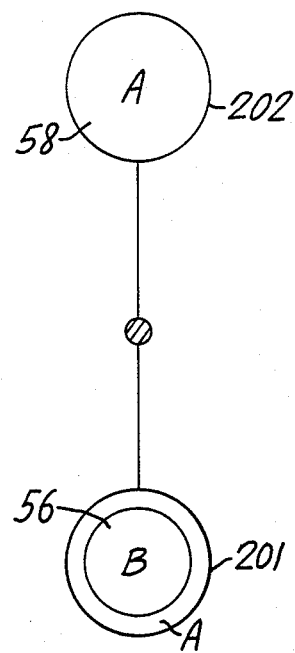

Another variably controllable conveying means between the extruded material streams is one that uses a rotating pivot mechanism, FIGS. 7A–7C. In this embodiment, the rotating mechanism has two sampling ports 56 and 58, a center 52, and a means for causing these ports to rotate about center 52 between extrusion channels 201 and 202. Initially, sampling port 56 is aligned with channel 202, which in the embodiment depicted carries coextruded melt stream AB, while pivot sampling port 58 is aligned with channel 201, which in this embodiment carries melt stream material A. When activated, FIG. 7B, sampling ports 56 and 58 rotate about their center 52 and exchange melt stream segments between channels 201 and 202, FIG. 7C.

Although the above embodiments disclose sampling ports for conveying equally sized extrusion stream segments between two such streams, a segment from a stream with a larger or smaller diameter (or larger or smaller cross-sectional area) could be conveyed into a stream with a larger or smaller diameter (or larger or smaller cross-sectional area). While the output of the larger product stream might decrease when the smaller segment was being introduced into that stream, such a result would not interfere with the operation of the invention.

Figure 8:
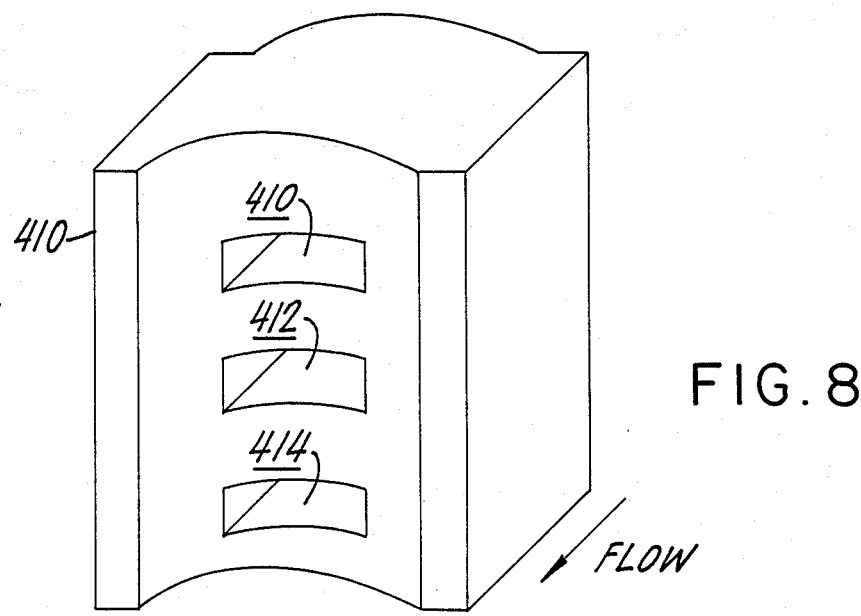
FIG. 8 is an orthographic projection of a shuttle that has shaped sampling ports.

Operation of the invention as described would virtually eliminate the effects of boundary layer drag that would otherwise smear the edges of an encapsulated material. Shaping the sampling port in anticipation of and to compensate for any edge smearing would also prevent such smearing. FIG. 8 is an orthographic projection of a shuttle conveying means 401 incorporating shaped sampling ports 410, 412 and 414. FIG. 9A is a view of the top of port 412 carrying material stream ABA. The large arrows in FIG. 8 and FIG. 9A show the direction of the material streams' flow. The smaller arrows in FIG. 9A, within material B, indicate the relative strength of the drag caused by the walls of the melt channel upon a segment with that shape as it flows through an extrusion channel. The longer arrows indicate larger relative magnitudes of drag.

After segment B is encapsulated within another material stream, boundary drag could distort the encapsulated segment. Shaping the transferred segment as shown anticipates this distortion. After traveling through the channel, drag will reshape the encapsulated segment, much as the reversed flow direction of the segment in the embodiment illustrated by FIGS. 4A-4C reshaped that segment. If an encapsulated segment with right-angled edges and borders was desired, by shaping the sampling port, FIG. 9A, an encapsulated segment with such borders will be produced, FIG. 9B.

A sampling port in a conveying means could be similarly shaped to compensate for any smearing that might occur in an encapsulated segment.

While the material to be encapsulated in the preferred embodiment is a thermoplastic resin, the invention is not limited to the use of such resins. Any type of extrudable material may be used. Thus, the present invention can produce a product that has applications in many different fields.

For example, in one embodiment, the method described herein may be used to produce an encapsulated pharmaceutical product. In this embodiment, a drug mixed with an extrudable material capable of being physiologically absorbed by a human or an animal would be encapsulated. Such a mixture would be introduced into and extruded through channel 2 as material B, FIGS. 1A-1E. The extrudable drug mixture would then be encapsulated within another extrudable material. The encapsulating and encapsulated materials could be ingested through a circulatory or digestive system. By selecting an encapsulating material with an appropriate porosity to the drug and solubility in the biological carrier, the encapsulated material's release may be timed and controlled, thus regulating the release of that material into the body.

A product produced according to the present invention is also uniquely suited for medical devices because of the invention's ability to produce precisely measurable, uniformly and sharply shaped encapsulated material segments. In an embodiment for one such medical application, a thermoplastic catheter may be produced by the present invention. Such a catheter would have features not seen in currently available catheters. For example, a material that is opaque to x-radiation could be extruded and encapsulated within a conventional catheter thermoplastic material. The melt stream comprising the encapsulated radio-opaque material and the encapsulating thermoplastic could then be formed into a catheter by extrusion and forming techniques well known to those skilled in the art.

The encapsulated radio-opaque material would function as a marker within such a catheter, enabling a physician to precisely monitor the location of any selected portion of the catheter within a patient's body by using conventional medical x-ray devices. A physician might also use such a marked section of a catheter in conjunction with an x-ray device to indicate where a drug was to be injected into the catheter while it was within the patient's body.

In another embodiment, another medical product that could be produced according to the present invention is a catheter with sections that have differing flexural properties. A thermoplastic material having one flexural modulus could be encapsulated by a thin layer of another thermoplastic material having a different flexural modulus. The sections with encapsulated material would have different flexural properties than other sections. The extruded product would then be formed into a catheter. Such a catheter would have distinct and precisely identifiable sections with different flexural moduli. Such a catheter could be used in jointed areas of a body where one catheter section must be flexible enough to allow it to bend with the joint, and where an adjacent section of the catheter must be more rigid for use or for insertion.

In an embodiment for another application, a tray or dish with a browning or heating section may be produced according to the present invention. Such a dish would be used in a microwave oven. The dish would be comprised of an encapsulated material that absorbs microwaves produced by the oven. The encapsulating material would be transparent to such microwaves. Thus, a tray or dish formed from an extruded sheet with such an encapsulated microwave absorbing section would brown only those food items placed above those sections. In one such embodiment, a particulate metal such as aluminum particles could be included within a thermoplastic resin extruded as material B in channel 2 of FIGS. 1A-1E. This material would be encapsulated by thermoplastic material A that is transparent to microwaves. The invention would produce a continuous extruded stream of the encapsulated and encapsulating materials, which would then be sectioned and formed into trays or dishes according to techniques well known to those skilled in the art.

Similarly, the present invention could produce a dish with different heating sections for use in a conventional convection oven. Such a dish would use encapsulated and encapsulating materials that have different heat transfer properties. In one embodiment, such a dish could be formed from a product stream that had one thermoplastic material encapsulated within a lower heat-transferring thermoplastic material. The extruded stream would be subsequently thermoformed into a dish by techniques known to those skilled in the art so that the higher heat-transferring encapsulated segment was located under the portion of the dish in which the food was placed. The surrounding areas, including the handles, would be comprised of the lower heat transferring material, facilitating the handling of the dish after removal from the oven. The encapsulated material sections would retain more heat and would keep the food placed above those sections warm for longer periods.

Alternatively, a material stream could contain several different encapsulated materials with different heat transfer coefficients so that a dish formed from such a product stream contained sections with regions for foods that required different heating rates or serving temperatures.

In another application, the present invention could be used to reduce the amount of material that would otherwise be discarded or wasted during the fabrication of thermoformed products.

In a normal thermoforming process, sheets of extruded thermoplastic are pressed by heated platens and formed into shaped articles. However, only the central sections of such sheets are used to form the product. Large areas of the sheet, i.e., the edges and the areas between each of the formed articles (the inter-product area), are not used and are recycled or discarded. Where the thermoformed material is a multi-layer material, these regions may only be used as recycle or filler material, since the layers are not separable and can not substitute for virgin-grade resin. Multi-layered materials are generally more expensive than single-layered materials. Thus, more money is wasted when these multi-layered sheets are thermoformed than when a single-layer sheet is thermoformed. To reduce the amount of expensive inter-product and edge waste material produced by thermoforming multi-layer materials, a stream of multi-layered material could be encapsulated by an inexpensive material. The size of the encapsulated segment and the timing of the encapsulation would be adjusted so that only those portions of the product stream that were to be thermoformed into a shaped product would contain the more expensive multi-layered material required. The scrapped portions would be composed of the less expensive encapsulating material that could be more easily reused.

Figure 10A:
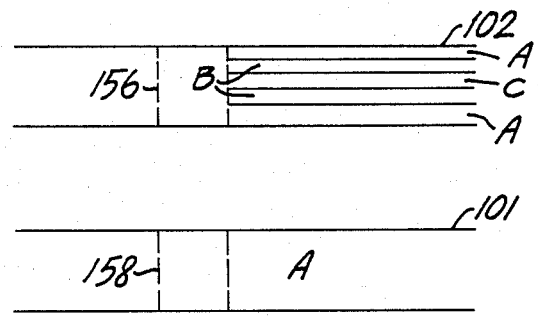
FIGS. 10A–10E are a schematic representation of the operation of an embodiment that minimizes the production of scrap material.

In one embodiment of this scrap-reducing process, coextrusion stream ABCBA that will ultimately be thermoformed into a final product is extruded through channel 102, FIG. 10A. Encapsulating, inter-product material A is extruded through channel 101. To avoid any waste of the coextruded material, the flow rates of the two streams and the timing of the encapsulation are such that only the portions of the product stream that will be formed into the thermoformed product will contain the coextruded multi-layered material and no multi-layered material is extruded as scrap from channel 102.

Figure 10B:
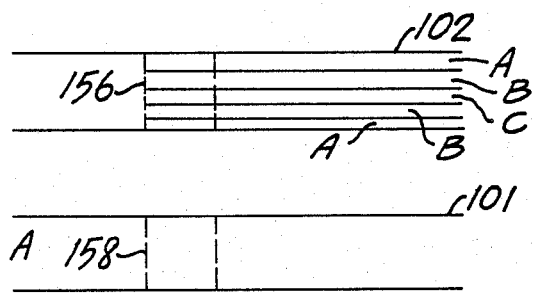
Figure 10C:
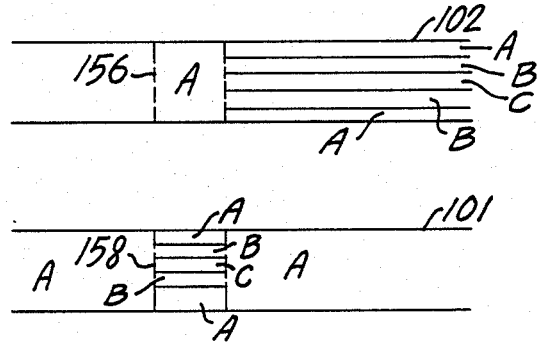

FIG. 10A shows such an embodiment at time t=0, before either stream has entered sampling ports 156 and 158. At time t=1, FIG. 10B, material stream A flowing in product channel 101 has traveled further than stream ABCBA flowing through coextrusion channel 102. When port 156 is filled by stream ABCBA, the conveying means is actuated, and the segment of material ABCBA in part 156 is removed from coextrusion channel 102 and is introduced into material stream A, FIG. 10C. As embodied herein, the conveying means is a rotating mechanism Segment A from channel 101 is thus conveyed to channel 102.

Figure 10D:
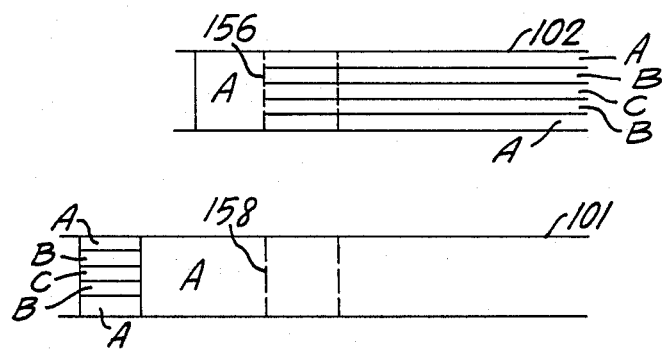
Figure 10E:
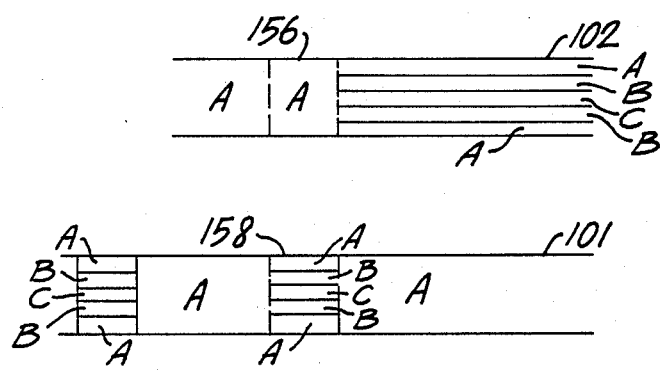

The apparatus then pauses until time t=2, FIG. 10D. During this pause, the encapsulated material is conveyed towards the die orifice with the proper product spacing required by the thermoforming process. Since the flow rates of the streams are individually adjusted, this pause also allows the coextruded material ABCBA in channel 102 to just fill port 156 at time t=2. The conveying means is again activated, and another segment of ABCBA is encapsulated by material A in stream 101, FIG. 10E. Since the flow rates of the two streams and the conveyance intervals are correctly timed, very little of coextruded material ABCBA is contained within the scrap stream extruded from channel 102. Similarly, because the flow rates and conveyance intervals produce a product stream extruded from channel 101 in which the inter-product material is comprised almost entirely of material A, very little of of the more expensive multi-layered material ABCBA is wasted in the subsequent thermoforming process. In this manner, the present invention could be used to produce products composed of multi-layer materials much more economically than possible using techniques and devices used previously.

Figure 11:
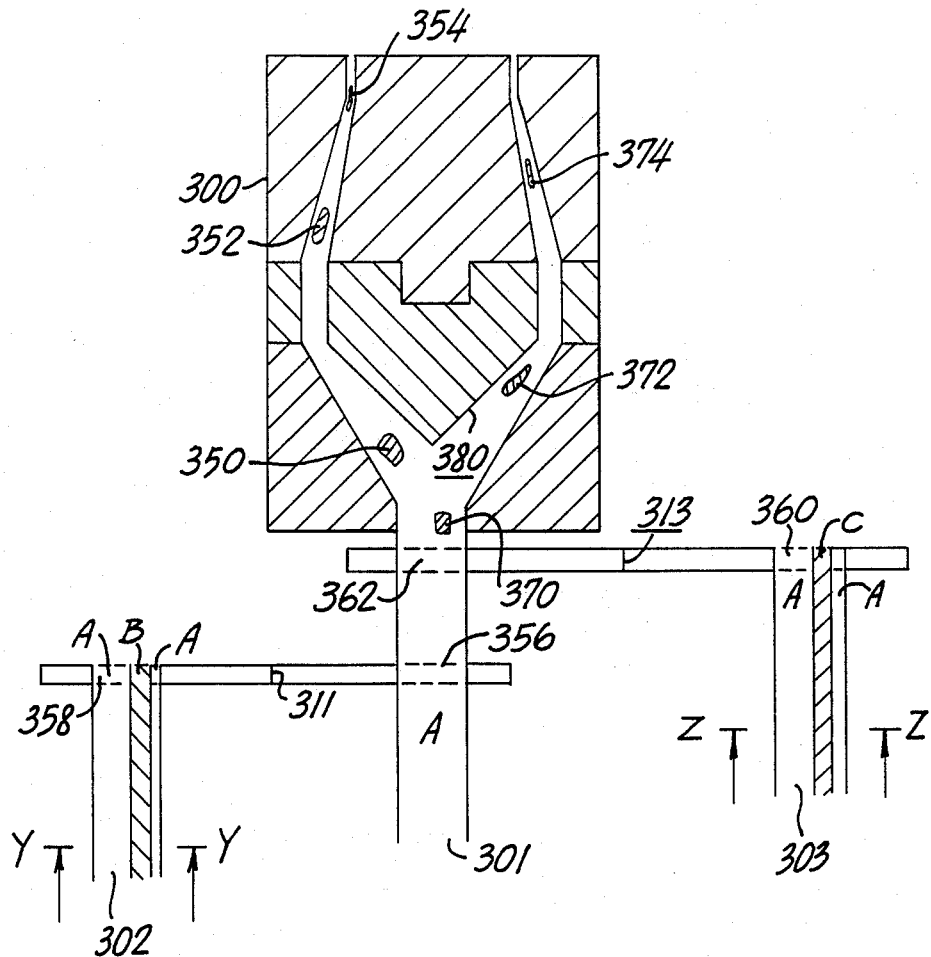
FIG. 11 is a cross-section of an embodiment of an apparatus according to the invention which can be used to produce marbelized or patterned sheets of film.

In another embodiment of the present invention, marbelized or patterned sheets of thermoplastic film can be produced. In FIG. 11, material A is extruded through melt channel 301. Material B, which has a different color than material A, is coextruded with material A in channel 302. Similarly, material C is coextruded with material A through channel 303. FIGS. 12A and 12B are cross-sections of coextruded streams 302 and 303 along lines Y—Y and Z—Z of FIG. 11. The conveying means, here, rotating mechanisms 311 and 313, are selectively actuated. Segment ABA from sampling port 358 is thus exchanged with stream segment A from sampling port 356, and segment ACA from sampling port 360 is exchanged with egment A from port 362. In this manner, portions of materials B and C are encapsulated within material A flowing through channel 301. The melt streams of channels 302 and 303 exit the extrusion die at other locations (not shown).

Encapsulated segments of materials B and C are conveyed within extrusion channel 301 into that portion of die 300 used to prepare the product stream for blown film formation. Segments 350, 352 and 354 of material B, and 370, 372 and 374 of material C, encapsulated within the product melt stream, flow through channel 301. That stream is split by die torpedo 380, forming an annular stream around the torpedo. The encapsulated segments of materials B and C are not aligned with the central axis of the melt stream in channel 301 as that stream is split by torpedo 380. Therefore, segments B and C will travel along different paths through the annular region of extrusion die 300. Upon exiting the die orifice, the melt stream may be blown into a thin sheet of film according to methods well known in the art. Such film will be marbelized or patterned with encapsulated materials B and C, FIG. 13.

Figure 13:
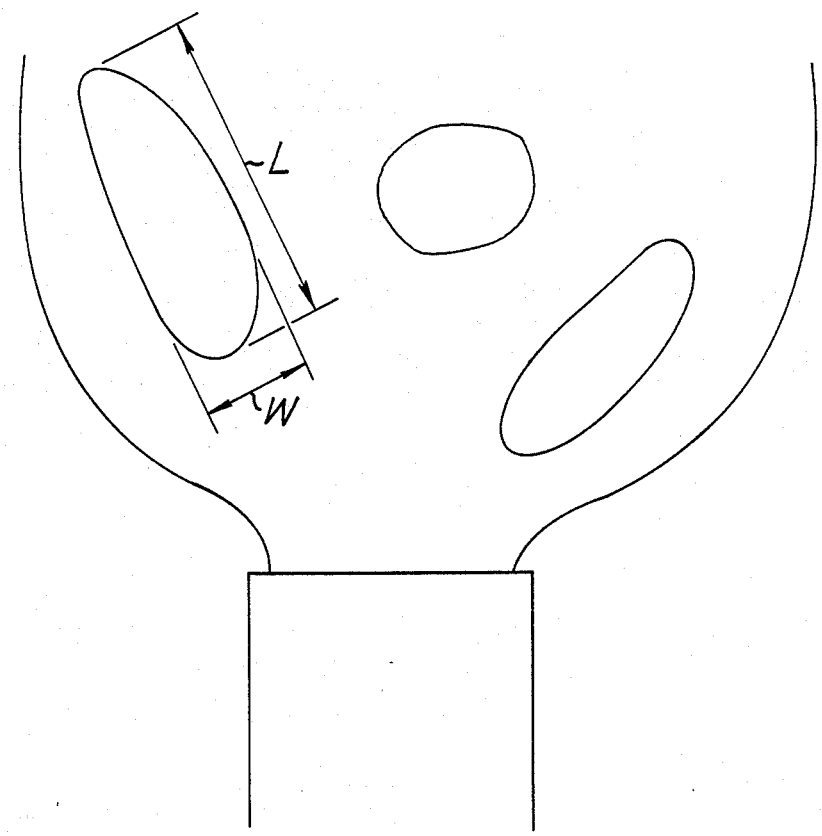
FIG. 13 is a portion of the surface of a sheet of film produced by the embodiment of FIG. 11.

In general, the length "L" of the encapsulated segment within the blown sheet, FIG. 13, may be controlled by varying the length of segment B or C taken from coextrusion stream ABA or ACA. Length "L" may also be altered by activating rotating mechanism 311 or 313 before the segment conveyed from the coextrusion stream in channels 302 or 303 completely passes through any of the sampling ports within channel 301. Thus, where a segment of coextrusion stream ABA has been conveyed to channel 301, as it passes through sampling port 362, rotating mechanism 313 may be activated. As a result, a portion of material segment ABA will be removed from the product stream in channel 301 and would be replaced by segment ACA. In this manner, encapsulated material segments of differing size may be created in the product steam by the varied actuation of the rotating mechanisms. This will alter the length of the segment that appears in the blown film.

The width "W" of an encapsulated material segment within the blow film product, FIG. 13, may be controlled by varying the cross-sectional size of that material in its coextrusion melt stream. Thus, a coextrusion material stream whose material to be encapsulated has a larger cross-sectional area will produce a blown film product with a correspondingly wider spot.

Extruded products which are esthetically pleasing can also be produced by the invention. Thus, the extrudable materials carried in the channels of the present invention can be of different colors or compositions and can be combined in various ways to produce a product having a pleasant visual pattern.

While the invention has been described with reference to specific embodiments, this is solely for illustrative purposes and should not be construed to limit the scope of the invention.

It will be apparent to those skilled in the art that various modifications can be made in the method and apparatus for producing encapsulated products of the present invention without departing from the scope or spirit of the invention. Thus, it is intended that the present invention cover the modifications and variations of this invention as they are covered by the scope of the appended claims and their equivalents.

What is claimed is:

1. A method of producing a product containing encapsulated material by extrusion in an extrusion apparatus, comprising the steps of:
    (a) extruding a first stream of first material and a second stream of second material in a first channel and a second channel, respectively said first material stream in said first channel is a single material and said second material stream in said second channel is a co-extruded material having a core and an outer layer, which continuously surrounds said core about the longitudinal axis of said core, said outer layer and said first material being of the same composition;
    (b) removing a first cross-sectional segment of said first material stream from said first channel; and
    (c) replacing, in said first channel, said first cross-sectional segment removed from said first channel with a second cross-sectional segment of material of said second stream removed from said second channel, said second segment containing said co-extruded material;
    (d) thereby encapsulating said core within material having the composition of that flowing through said first channel.

2. The method of claim 1 wherein the streams of material are heat plasticized thermoplastic materials.

3. The method of claim 1 wherein said method is carried out continuously.

4. The method of claim 3 wherein the steps of removing, replacing, and thereby encapsulating the cross-sectional segments are carried out at predetermined intervals.

5. The method of claim 3 wherein the steps of removing and replacing of the cross-sectional segments are carried out at random intervals.

6. The method of claim 2 wherein the product containing the encapsulated core is subsequently extruded from the extrusion apparatus and is cooled below the thermoplastic temperature of each of the first and second materials.

7. The method of claim 1 wherein the core is one or more non-plasticized materials and the outer layer is a matrix of plasticized material.

8. The method of claim 7 wherein the non-plasticized materials are particulate metals.

9. The method of claim 1 wherein the cross-sectional segment removed from the first channel replaces the cross-sectional segment removed from the second channel.

10. The method of claim 2 wherein the product is extruded from a die of the extrusion apparatus and is subsequently formed into sheets, film, or other shaped forms.

11. The method of claim 1 comprising the additional steps:
    (a) removing a cross-sectional segment of material from a third channel;
    (b) replacing the cross-sectional segment removed from the third channel with a cross-sectional segment of the material from the first channel containing the encapsulated material so that the cross-sectional segment of the material from the first channel containing the encapsulated material flows through the third channel in the oposite direction from its flow through the first channel; and
    (c) extruding the cross-sectional segment flowing through the third channel from an exit orifice of the third channel after the encapsulated material travels through the third channel, in the direction opposite that in which it flowed in the first channel.

12. The method of claim 1, wherein said extruding step forms said outer layer to have a circular perimeter about said core to form an annulus about said core.

13. The method of claim 1, wherein said extruding step forms said outer layer to have a non-circular perimeter about said core.

* * * * *